Figure 2:
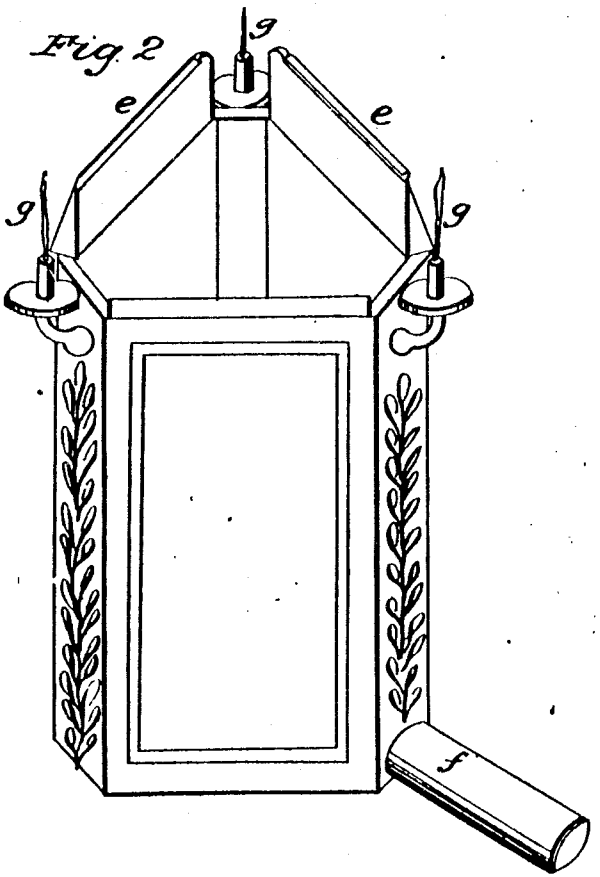
Figure 1:
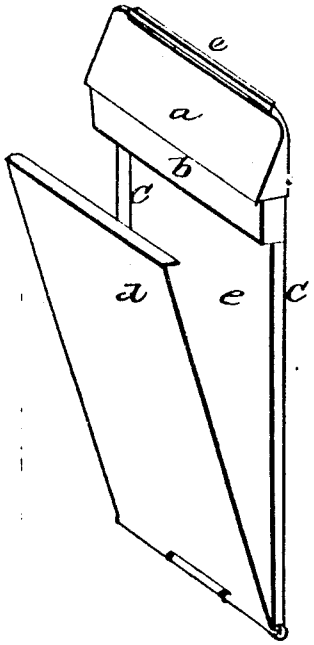

M. B. DYOTT.

BEST AVAILABLE COPY

Lamp.

~~No. 37~~
AI 37

A. I. Patented March 18, 1841